(12) United States Patent
Johnson et al.

(10) Patent No.: US 11,422,386 B2
(45) Date of Patent: Aug. 23, 2022

(54) FLAT FOLD EYEGLASSES AND CASE

(71) Applicant: MICROVISION OPTICAL, LLC, San Diego, CA (US)

(72) Inventors: David Johnson, San Diego, CA (US); Steven C. K. Ng, Dong Guan (CN)

(73) Assignee: MICRO VISION OPTICAL, LLC, San Diego, CA (US)

(*) Notice: Subject to any disclaimer, the term of this patent is extended or adjusted under 35 U.S.C. 154(b) by 118 days.

(21) Appl. No.: 16/503,985

(22) Filed: Jul. 5, 2019

(65) Prior Publication Data

US 2020/0012122 A1 Jan. 9, 2020

Related U.S. Application Data

(60) Provisional application No. 62/694,352, filed on Jul. 5, 2018.

(51) Int. Cl.
*G02C 5/22* (2006.01)
*G02C 5/00* (2006.01)
*A45C 11/04* (2006.01)

(52) U.S. Cl.
CPC ............ *G02C 5/2263* (2013.01); *A45C 11/04* (2013.01); *G02C 5/006* (2013.01); *G02C 5/229* (2013.01)

(58) Field of Classification Search
CPC ...... G02C 5/2263; G02C 5/006; G02C 5/229; A45C 11/04
USPC .................................... 351/153, 156, 63, 41
See application file for complete search history.

(56) References Cited

U.S. PATENT DOCUMENTS

| | | | | |
|---|---|---|---|---|
| 2,552,147 A | * | 5/1951 | Browning | B25G 1/063 |
| | | | | 464/120 |
| 3,476,466 A | * | 11/1969 | Hopkins | G02C 5/2263 |
| | | | | 351/115 |
| 3,533,687 A | * | 10/1970 | Herzig | G02C 5/10 |
| | | | | 351/121 |
| 5,638,146 A | | 6/1997 | Nannini | |
| 7,513,617 B1 | * | 4/2009 | Alford | G02C 3/04 |
| | | | | 351/153 |
| 11,042,043 B1 | * | 6/2021 | Ginocchio | G02C 5/2209 |

(Continued)

FOREIGN PATENT DOCUMENTS

| | | | | |
|---|---|---|---|---|
| CN | 109856813 A | * | 6/2019 | ............ G02C 5/22 |
| DE | 19629491 A1 | * | 1/1998 | ........ G02C 5/2254 |
| KR | 20120005158 U | * | 7/2012 | ............. A45C 13/04 |

OTHER PUBLICATIONS

International Search Report and Written Opinion dated Oct. 24, 2019 for PCT Corresponding application PCT/US2019/040716 (12 pages).

*Primary Examiner* — George G. King
(74) *Attorney, Agent, or Firm* — Procopio, Cory, Hargreaves & Savitch LLP

(57) ABSTRACT

Eyeglasses are provided capable of folding into a substantially flat configuration that may be fitted inside a compact case or other narrow space. The eyeglasses may include a frame configured to hold one or more lenses and defining an imaginary plane, at least one temple piece, and at least one hinge connecting the at least one temple piece to the frame, wherein the hinge is configured to rotate the at least one temple piece between a first position extending substantially perpendicular to the imaginary plane defined by the frame, and second position extending substantially parallel to the imaginary plane.

9 Claims, 4 Drawing Sheets

(56) References Cited

U.S. PATENT DOCUMENTS

| | | |
|---|---|---|
| 2005/0146675 A1 | 7/2005 | Benavides |
| 2008/0201901 A1 | 8/2008 | Cescon |
| 2013/0155369 A1* | 6/2013 | Chen .................. G02C 5/006 351/115 |
| 2016/0246070 A1* | 8/2016 | Johnson .............. G02C 5/006 |
| 2018/0095294 A1 | 4/2018 | Johnson |

* cited by examiner

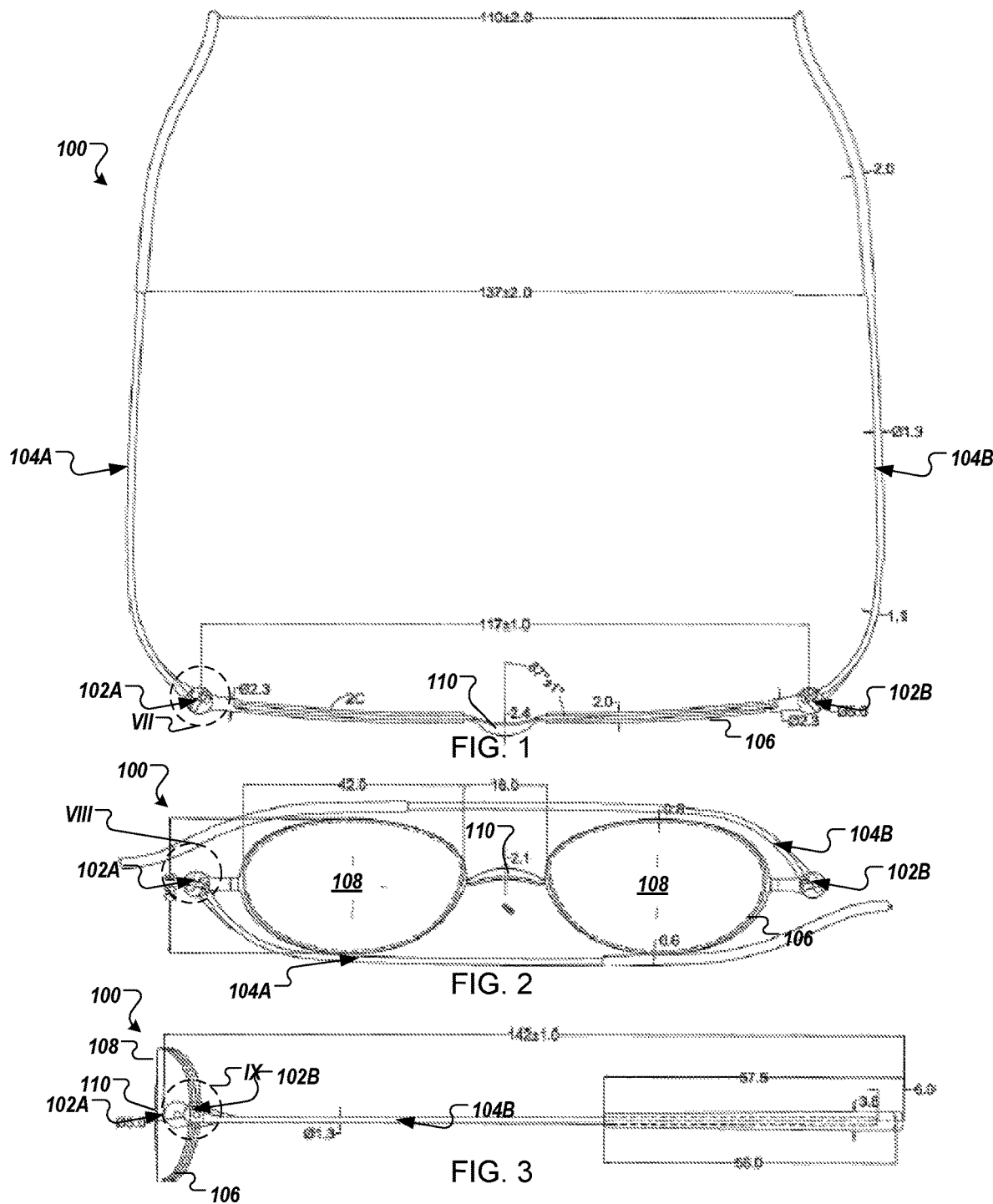

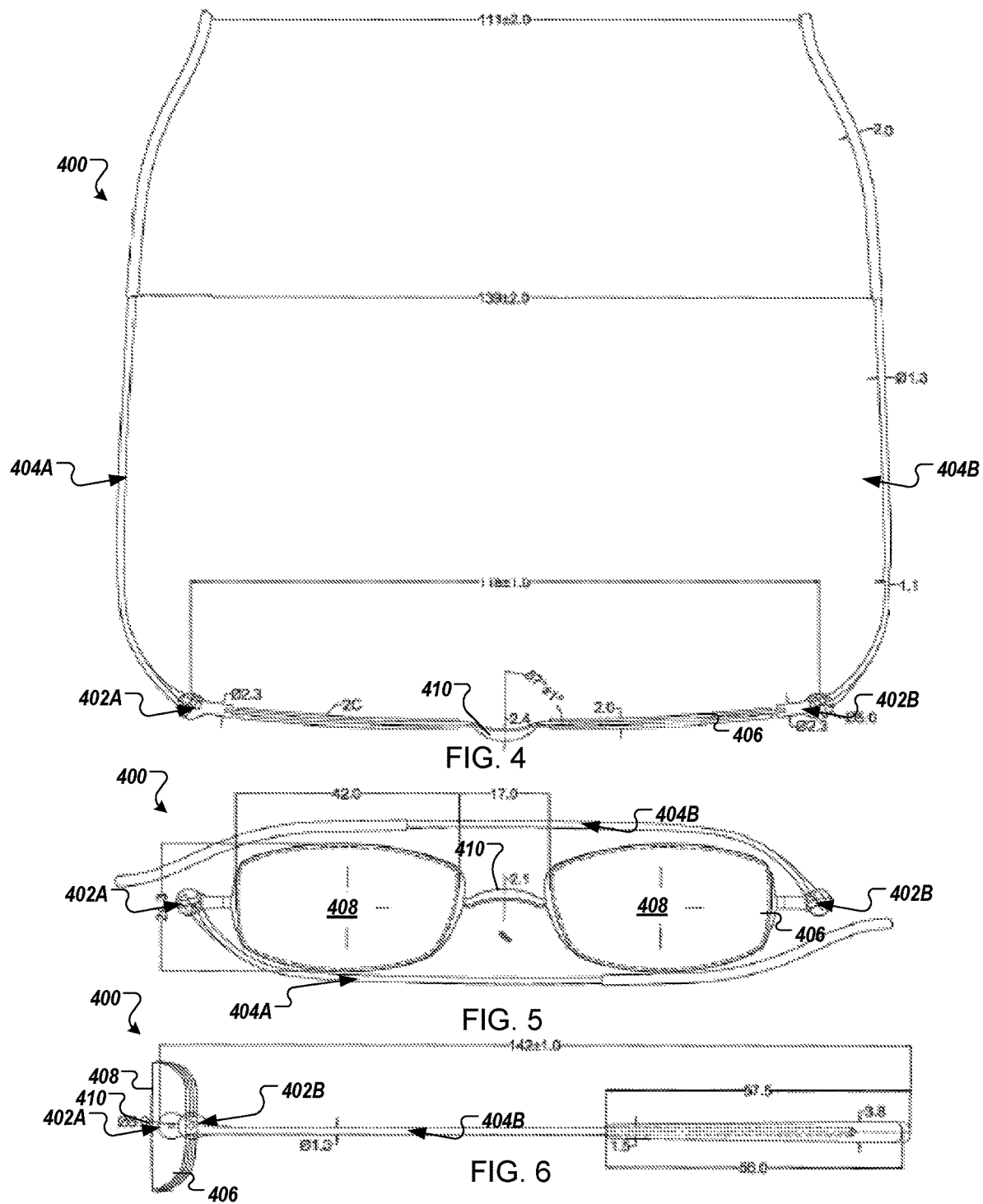

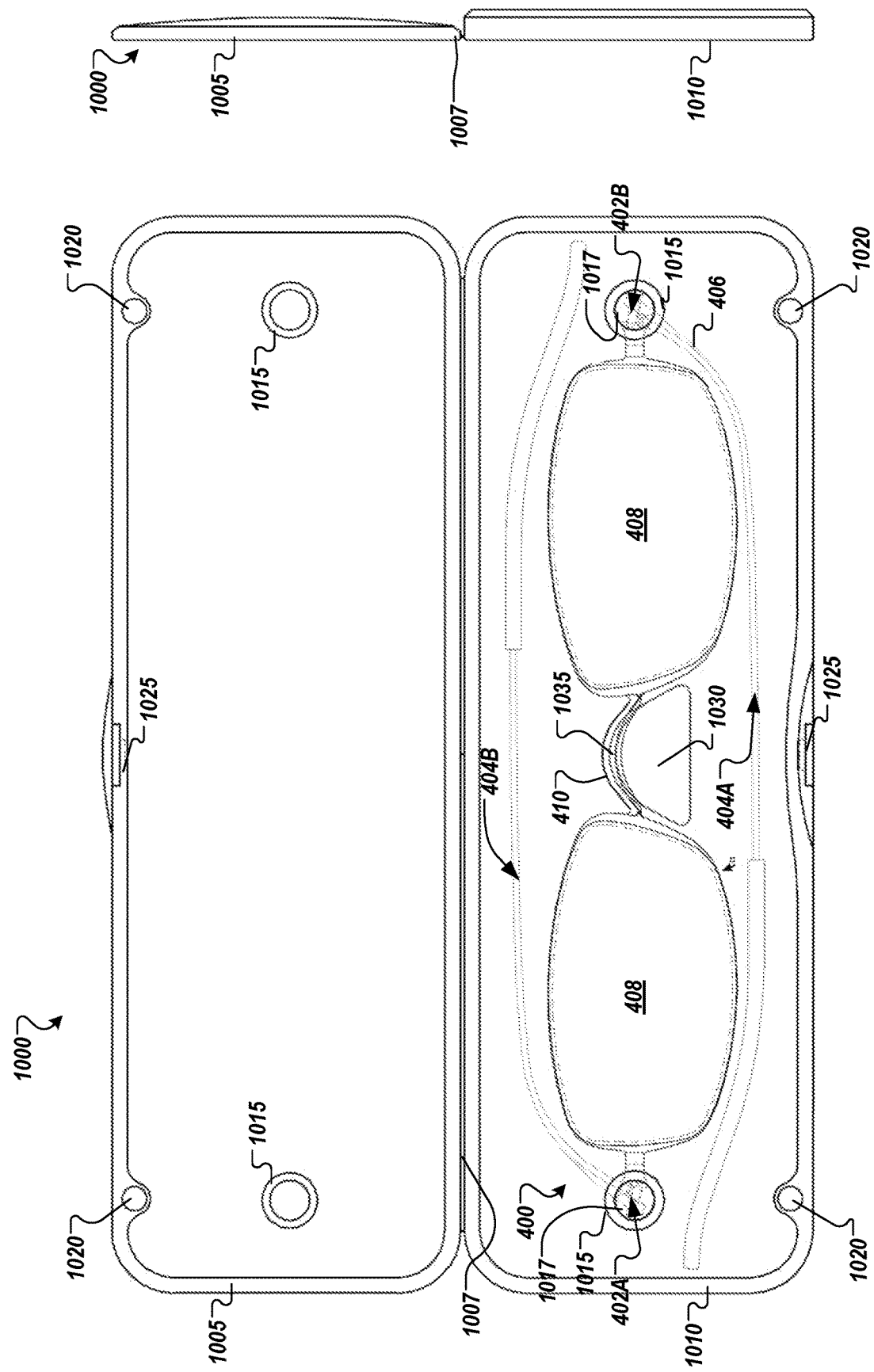

FLAT FOLD EYEGLASSES AND CASE

CROSS-REFERENCE TO RELATED APPLICATIONS

This application claims benefit of priority from Provisional U.S. Patent application Ser. No. 62/694,352, filed Jul. 5, 2018, the contents of which are incorporated by reference.

TECHNICAL FIELD

This application generally relates to designs of eyeglasses and specifically to eyeglasses with hinges which can be folded into an ultra-compact configuration and a case for the eyeglasses.

BACKGROUND

When not being worn, related art eyeglasses are generally folded at the temples via a pair of hinges near the frame of the eyeglasses that folds each temple horizontally toward the frame. This creates a smaller profile of the related art eyeglasses than when the eyeglasses are in their unfolded configuration to be worn by a user. However, this related art folded configuration remains relatively thick and therefore also requires a relatively thick eyeglasses case for storage. Such related art eyeglasses case is generally bulky and not easily stored on a person, such as inside a cloth pocket, or in a small personal bag.

Therefore, there is a need for eyeglasses designs which allow a pair of eyeglasses to be folded more compactly and fitted into a more compact case.

SUMMARY

Embodiments described herein may provide eyeglasses capable of folding into a substantially flat configuration that may be fitted inside a compact case or other narrow space. The eyeglasses may include a frame configured to hold one or more lenses and defining an imaginary plane, at least one temple piece, and at least one hinge connecting the at least one temple piece to the frame, wherein the hinge is configured to rotate the at least one temple piece between a first position extending substantially perpendicular to the imaginary plane defined by the frame, and second position extending substantially parallel to the imaginary plane.

A first aspect of an example implementation of the present application may include a pair of foldable eyeglasses. The eyeglasses may include a frame configured to hold one or more lenses and defining an imaginary plane, at least one temple piece, and at least one hinge connecting the at least one temple piece to the frame, wherein the hinge is configured to rotate the at least one temple piece between a first position extending substantially perpendicular to the imaginary plane defined by the frame, and second position extending substantially parallel to the imaginary plane.

A second aspect of an example implementation may additionally include the at least one hinge being a ball and socket joint.

A third aspect of an example implementation may additionally include the ball of the at least one hinge being disposed on the at least one temple piece and the socket being disposed on the frame and surrounding substantially the entire ball.

A fourth aspect of an example implementation may additionally include the socket further having a groove through which the at least one temple piece extends, the groove defining a narrow range of motion for the at least one temple piece relative to frame.

A fifth aspect of an example implementation may additionally include the narrow range of motion being 90°.

A sixth aspect of an example implementation may additionally include the groove having a width sized to provide frictional resistance to movement of the at least one temple piece relative to the frame.

A seventh aspect of an example implementation may additionally include the width of the groove being substantially equal to a thickness of the at least one temple piece.

An eight aspect of an example implementation may additionally include the groove having a retaining mechanism configured to hold the at least one temple piece in one or more of the first position and second position.

A ninth aspect of an example implementation may additionally include the retaining mechanism being a flexible protrusion configured to hold the at least one temple piece in one or more of the first position and second position.

A tenth aspect of an example implementation may additionally include the hinge further including a fastener inserted through the ball of the at least one temple piece located within the socket to retain the ball within the socket.

An eleventh aspect of an example implementation may additionally include the fastener being sized and positioned to rotate within the socket in coordination with rotation of the at least one temple piece between the first position and the second position relative to the frame.

BRIEF DESCRIPTION OF THE DRAWINGS

The structure and operation of the present invention will be understood from a review of the following detailed description and the accompanying drawings in which like reference numerals refer to like parts and in which:

FIG. 1 illustrates a top view of a pair of folding eyeglasses according to a first example implementation of the present application.

FIG. 2 illustrates a front view of a pair of folding eyeglasses according to the first example implementation of the present application.

FIG. 3. Illustrates a side view of a pair of folding eyeglasses according to the first example implementation of the present application.

FIG. 4 illustrates a top view of a pair of folding eyeglasses according to a second example implementation of the present application.

FIG. 5 Illustrates a front view of a pair of folding eyeglasses according to the second example implementation of the present application.

FIG. 6 illustrates a side view of a pair of folding eyeglasses according to the second example implementation of the present application.

FIG. 10 illustrates a top view of a case housing a pair of the folding eyeglasses according to example implementations of the present application.

FIG. 11 illustrates a side view of a case housing a pair of the folding eyeglasses according to example implementations of the present application.

DETAILED DESCRIPTION

Figure 7:
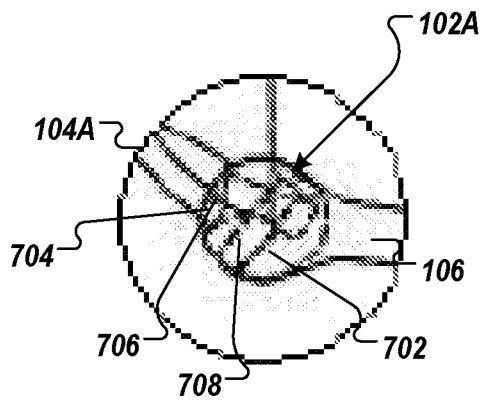
FIG. 7 illustrates an enlarged view of region VII of FIG. 1.

Some embodiments disclosed herein provide for foldable eyeglasses.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

FIG. 1 illustrates a top view of a pair of folding eyeglasses 100 according to a first example implementation of the present application. FIG. 2 illustrates a front view of a pair of folding eyeglasses 100 according to the first example implementation of the present application. FIG. 3. Illustrates a side view of a pair of folding eyeglasses 100 according to the first example implementation of the present application.

As illustrated in FIG. 1, the eyeglasses 100 include a first set of hinges or pivot connections 102 including a pair of hinges 102A and 102B located a short distance from the rim or frame 106 of the eyeglasses. The hinges 102 are configured to collapse the temples 104A and 104B of eyeglasses 100 horizontally into the frame 106 and vertically above and/or below the frame 106 to form a flat folded configuration of eyeglasses 100. More specifically, the hinges 102 may be configured to allow the temples 104A and 104B to rotate from a position perpendicular to the plane of the frame 106 (e.g., perpendicular to the surface of lenses 108) to a position parallel and in the same plane of the frame 106 (e.g., parallel to the surface of the lenses 108). For example, hinge 102A may be configured to collapse temple 104A into the frame 106 and vertically below the frame 106 as illustrated in FIG. 2. Further, hinge 102B may be configured to collapse temple 104B into frame 106 and vertically above frame 106 as illustrated in FIG. 2. The structure and operation of the hinges 102 are discussed in greater detail below.

FIG. 2 illustrates eyeglasses 100 in the folded configuration where right hinge 102A on right temple 104A and left hinge 102B of left temple 104B of the hinges 102 are both in a folded configuration. In this configuration, temple 104A has been collapsed into the frame 106 and is vertically located below the frame 106 as illustrated. Further, temple 104B has been collapsed into frame 106 and is vertically above frame 106 as illustrated. Thus, the eyeglasses 100 from a substantially flat configuration with the temples 104A and 104B being substantially parallel and in the same plane as the frame 106 holding the lenses 108. As illustrated, the eyeglasses 100 include rounded or oval-shaped lenses 108 connected by a nose bridge 110 that may include various types of vision-correction lenses, sunglass lens, or any other type of lens that might be apparent to a person of ordinary skill in the art.

FIG. 3 illustrates eyeglasses 100 in the unfolded configuration where right hinge 102A on right temple 104A and left hinge 102B of left temple 104B of the hinges 102 are both in an unfolded configuration. In this configuration, temple 104A extends substantially perpendicular to the plane of the frame 106 holding the lenses 108. Similarly, temple 104b extends also extends substantially perpendicular to the plane of the frame holding the lenses 108.

FIG. 4 illustrates a top view of a pair of folding eyeglasses 400 according to a second example implementation of the present application. FIG. 5 Illustrates a front view of a pair of folding eyeglasses 400 according to the second example implementation of the present application. FIG. 6 illustrates a side view of a pair of folding eyeglasses 400 according to the second example implementation of the present application. The folding eyeglasses 400 may be similar to the eyeglasses 100 discussed above and any aspects discussed with respect to eyeglasses 100 may also apply to example implementations of eyeglasses 400.

As illustrated in FIG. 4, the eyeglasses 400 include a first set of hinges or pivot connections 402 including a pair of hinges 402A and 402B located a short distance from the rim or frame 406 of the eyeglasses. Hinges 402 are configured to collapse the temples 404A and 404B of eyeglasses 400 horizontally into the frame 406 and vertically above and/or below the frame 406 to form a flat folded configuration of eyeglasses 400. More specifically, the hinges 402 may be configured to allow the temples 404A and 404B to rotate from a position perpendicular to the plane of the frame 406 (e.g., perpendicular to the surface of lenses 408) to a position parallel and in the same plane of the frame 406 (e.g., parallel to the surface of the lenses 408). For example, hinge 402A may be configured to collapse temple 404A into the frame 406 and vertically below the frame 406 as illustrated in FIG. 5. Further, hinge 402B may be configured to collapse temple 404B into frame 406 and vertically above frame 406 as illustrated in FIG. 5. The structure and operation of the hinges 402 may be similar to the structure and operation of hinges 102 discussed in greater detail below.

FIG. 5 illustrates eyeglasses 400 in the folded configuration where right hinge 402A on right temple 404A and left hinge 402B of left temple 404B of the hinges 402 are both in a folded configuration. In this configuration, temple 404A has been collapsed into the frame 406 and is vertically located below the frame 406 as illustrated. Further, temple 404B has been collapsed into frame 406 and is vertically above frame 406 as illustrated. Thus, the eyeglasses 400 from a substantially flat configuration with the temples 404A and 404B being substantially parallel and in the same plane as the frame 406 holding the lenses 408. As illustrated, the eyeglasses 400 include square or rectangular-shaped lenses 408 by a nose bridge 410 that may include various types of vision-correction lenses, sunglass lens, or any other type of lens that might be apparent to a person of ordinary skill in the art.

FIG. 6 illustrates eyeglasses 400 in the unfolded configuration where right hinge 402A on right temple 404A and left hinge 402B of left temple 404B of the hinges 402 are both in an unfolded configuration. In this configuration, temple 404A extends substantially perpendicular to the plane of the frame 406 holding the lenses 408. Similarly, temple 404b extends also extends substantially perpendicular to the plane of the frame holding the lenses 408.

Figure 8:
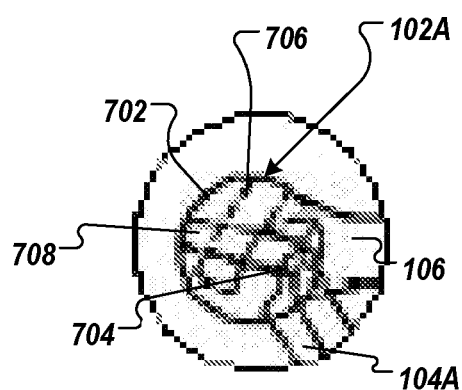
FIG. 8 illustrates an enlarged view of region VIII of FIG. 2.
Figure 9:
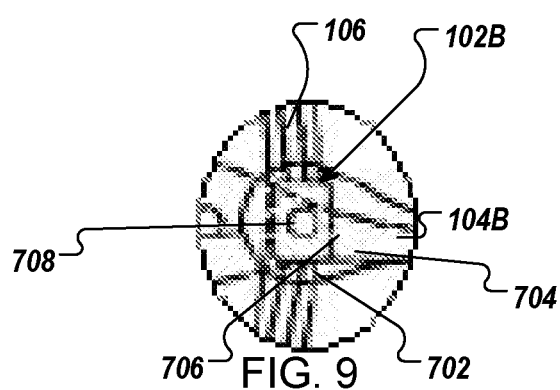
FIG. 9 illustrates an enlarged view of region IX of FIG. 3.

FIGS. 7-9 illustrate enlarged views of hinges illustrated in FIGS. 1-3 discussed above. FIG. 7 illustrates an enlarged view of region VII of FIG. 1. Further, FIG. 8 illustrates an enlarged view of region VIII of FIG. 2. Additionally, FIG. 9 illustrates an enlarged view of region IX of FIG. 3. As illustrated, FIGS. 7 and 8 illustrate enlarged view of the right hinge 102A of the right temple 104A connecting to the frame 106. Similarly, FIG. 9 illustrates an enlarged view of the left hinge 102B of the left temple 104B connecting to the frame 106.

Though detailed discussion of the right hinge 102A is provided, the left hinge 102B may have a substantially similar structure and provide similar functionality. Thus, redundant description may be omitted. As discussed above, the hinges 102 may be configured to allow the temples 104A and 104B to rotate from a position perpendicular to the plane of the frame 106 (e.g., perpendicular to the surface of lenses 108) to a position parallel and in the same plane of the frame 106 (e.g., parallel to the surface of the lenses 108).

As illustrated, the right hinge 102A includes a ball and socket joint with the sockets 702 being located on the frame 106. A ball 704 formed on the end of the right temple 104A is inserted and surrounded by the socket 702 located on the frame 106. In some example implementations, the socket 702 may fully surround the ball 704 with a narrow groove 706 being formed in the socket 702 to provide and control the rotation of the ball 704 within the socket 702. This narrow groove 706 provides the range of motion of the right temple 104A relative to the frame 106 (e.g., a range of motion from a position perpendicular to the plane of the frame 106 to a position parallel and in the same plane of the frame 106). In some example implementations, the narrow groove may define only a 90° range of motion from within the plane of the frame 106 to perpendicular to the plane of the frame 106.

In some example implementations, the width of the groove 706 may be sized to provide friction or resistance when the right temple 104A is moved relative to the frame 106. This may allow the right temple 104A to remain in either a folded or unfolded configuration once placed by a user. For example, the right temple 104A may remain in a folded configuration once placed by a user until the user repositions the right temple 104A into an unfolded configuration or vice versa.

In other example implementations, the groove 706 may include a retaining mechanism at one or both of the folded and unfolded positions to hold the right temple 104A in position once placed by a user. For example, a flexible rib or protrusion may be provided within the groove 706 to hold the temple 104A into position once placed by a user.

Further, in some example implementations, the hinge 104A may also include a fastener 708 (e.g., a screw, bolt or other fastener that might be apparent to a person of ordinary skill in the art) may be inserted through the end of the ball 704 of the temple 104A. Once inserted, the fastener 708 may be located entirely within the socket 702. During movement of the temple 104A, the fastener 708 may travel along the interior of the socket 702. In some example implementations, the fastener 708 may travel within a grove or slot provided on the interior of the socket.

In some example implementations, the eyeglass temples 104A/104B, hinges 102, and frame 106 may be made of the same material, such as metal or the like. Alternatively, in other example implementations, the entire frame 106 may be formed from injection molded plastic such as acetate or cellulose acetate, with the temples 104A/104B and hinges 102 may be formed of metal. This may result in a strong but lightweight structure.

In some example implementations, a case may be coupled to eyeglasses such as those illustrated in FIGS. 1-9. FIG. 10 illustrates a top view of a case 1000 housing a pair of the folding eyeglasses 400 according to example implementations of the present application. Further, FIG. 11 illustrates a side view of the case housing the folding eyeglasses 400 according to example implementations of the present application.

As discussed above, the eyeglasses 400 include a first set of hinges or pivot connections 402 including a pair of hinges 402A and 402B located a short distance from the rim or frame 406 of the eyeglasses. Hinges 402 are configured to collapse the temples 404A and 404B of eyeglasses 400 horizontally into the frame 406 and vertically above and/or below the frame 406 to form a flat folded configuration of eyeglasses 400. More specifically, the hinges 402 may be configured to allow the temples 404A and 404B to rotate from a position perpendicular to the plane of the frame 406 (e.g., perpendicular to the surface of lenses 408) to a position parallel and in the same plane of the frame 406 (e.g., parallel to the surface of the lenses 408). For example, hinge 402A may be configured to collapse temple 404A into the frame 406 and vertically below the frame 406 as illustrated in FIG. 5. Further, hinge 402B may be configured to collapse temple 404B into frame 406 and vertically above frame 406 as illustrated in FIG. 5.

As illustrated in FIG. 10, the case 1000 includes upper and lower halves 1005 & 1010 connected by a hinge 1007 in a "clamshell" configuration. Each half 1005/1010 includes a pair of posts 1015 that are configured to cup and hold the hinges 402 (402a & 402B, respectively) of the eyeglasses 400. For example, each post 1015 may have a generally cylindrical shape with a hollow interior end design to engage a support the hinges 402. In some example implementations, a retainer mechanism 1030 may be positioned to engage the nose bridge 410 located between the lenses 408 to hold the eyeglasses 400 in the case 1000. For example, the retainer mechanism 1030 may be shaped to confirm to the nose bridge 410 and include flexible or elastic portion 1035 that at least partial covers the nose bridge 410 to hold the eyeglasses 400 within the case 1000.

Additionally, in some example implementations, the case 1000 may also include magnets 1020 located on opposing sides of the upper and lower halves 1005 & 1010 to assist in holding the halves together. Further, in some example implementations each of the upper and lower halves 1005 & 1010 may also include a latch mechanism 1025 to lock the case closed.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

We claim:

1. A pair of folding eyeglasses including:
   a frame configured to hold one or more lenses and defining an imaginary plane;
   a first temple piece;
   a first hinge connecting the first temple piece to the frame, wherein the first hinge comprises a first ball and socket joint and is configured to rotate the first temple piece between a first position in which the first temple piece extends substantially perpendicular to the imaginary plane defined by the frame, and a second position in which the first temple piece extends substantially parallel to the imaginary plane defined by the frame;
   a second temple piece; and
   a second hinge connecting the second temple piece to the frame, wherein the second hinge is configured to rotate the second temple piece between a first position in which the second temple piece extends substantially perpendicular to the imaginary plane defined by the frame, and a second position in which the second temple piece extends substantially parallel to the imaginary plane defined by the frame, wherein, when in the respective second positions, the first temple piece is positioned on a side of the frame opposite a side of the frame on which the second temple piece is a positioned, wherein the first ball and socket joint comprises a single groove that limits a range of motion of the first temple piece between the first position and the second position to a single plane, and wherein the first hinge is a single hinge with a single pivot point.

2. The pair of folding eyeglasses according to claim 1, wherein the ball of the first hinge is disposed on the first temple piece; and wherein the socket of the first hinge is disposed on the frame and surrounds substantially the entire ball of the first hinge.

3. The pair of folding eyeglasses according to claim 1, wherein the groove limits the range of motion of the first temple piece to 90°.

4. The pair of folding eyeglasses according to claim 1, wherein the groove has a width sized to provide frictional resistance to movement of the first temple piece relative to the frame.

5. The pair of folding eyeglasses according to claim 4, wherein the width of the groove is substantially equal to a thickness of the first temple piece.

6. The pair of folding eyeglasses according to claim 1, wherein the groove includes a retaining mechanism configured to hold the first temple piece in one or more of the first position and second position.

7. The pair of folding eyeglasses according to claim 6, wherein the retaining mechanism is a flexible protrusion configured to hold the first temple piece in one or more of the first position and second position.

8. The pair of folding eyeglasses according to claim 2, wherein the first hinge further comprises a fastener inserted through the ball of the first temple piece located within the socket to retain the ball within the socket.

9. The pair of folding eyeglasses according to claim 8, wherein the fastener is sized and positioned to rotate within the socket in coordination with rotation of the first temple piece between the first position and the second position relative to the frame.

* * * * *